United States Patent
Hung

(12) 
(10) Patent No.: US 8,669,489 B2
(45) Date of Patent: Mar. 11, 2014

(54) HIGH FLOW POWER CABLE FOR SMALL WELDING TORCH

(75) Inventor: Derek Yu-Fung Hung, Greenville, WI (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 13/323,526

(22) Filed: Dec. 12, 2011

(65) Prior Publication Data

US 2012/0152922 A1 Jun. 21, 2012

Related U.S. Application Data

(60) Provisional application No. 61/423,860, filed on Dec. 16, 2010.

(51) Int. Cl.
*B23K 9/10* (2006.01)

(52) U.S. Cl.
USPC ........... 219/130.1; 174/15.6; 174/15.7

(58) Field of Classification Search
USPC ............ 219/130.1, 136; 174/15.6, 15.7, 21 R
See application file for complete search history.

(56) References Cited

U.S. PATENT DOCUMENTS

| | | | | |
|---|---|---|---|---|
| 1,784,384 A | * | 12/1930 | Paugh .......................... | 219/120 |
| 2,701,818 A | | 2/1955 | Tims | |
| 5,004,865 A | * | 4/1991 | Krupnicki ................... | 174/15.7 |
| 5,060,287 A | * | 10/1991 | Van Egmond ............... | 392/301 |
| 6,454,598 B1 | * | 9/2002 | Burwell et al. .............. | 439/523 |
| 2005/0072762 A1 | * | 4/2005 | Delgado ....................... | 219/75 |

FOREIGN PATENT DOCUMENTS

DE 8403706 U1 5/1985

OTHER PUBLICATIONS

Machine translation of DE8403706.*
International Search Report & Written Opinion for application No. PCT/US2011/064786 mailed Mar. 29, 2012.

* cited by examiner

*Primary Examiner* — Henry Yuen
*Assistant Examiner* — John Wasaff
(74) *Attorney, Agent, or Firm* — Fletcher Yoder, P.C.

(57) ABSTRACT

The invention provides a high flow power cable for a welding system designed for effective cooling of the power cable while maintaining maneuverability of the cable. Provided is a power cable having two segments, the first segment being larger in diameter than the second segment. The first segment is generally coupled to the power source and the second segment is coupled to the welding torch. The first segment includes a thicker wire, which has less resistance and dissipates less heat while the second segment includes a thinner wire, allowing for easier handling. Additionally, cooling fluid is conducted through the first segment and the second segment, further cooling the cable.

20 Claims, 6 Drawing Sheets

HIGH FLOW POWER CABLE FOR SMALL WELDING TORCH

CROSS REFERENCE TO RELATED APPLICATIONS

This application is a Non-Provisional patent application of U.S. Provisional Patent Application No. 61/423,860 entitled "High Flow Power Cable for Small Welding Torch", filed Dec. 16, 2010, which is herein incorporated by reference.

BACKGROUND

The invention relates generally to cooling power cables for welding systems, and specifically those having small welding torches.

In welding applications, power cables are generally used to carry current from the welding power supply to a welding torch. These high currents may cause the power cable to increase in temperature, often becoming quite hot. Hence, welding torch power cables are often cooled by gas, water or a coolant. Typically, such power cables consist of a copper conductor or conductors inside a rubber or vinyl hose or insulative jacket, through which the cooling fluid flows.

Oftentimes, small welding torches may be used for welding projects having small work pieces and fine or complex weld joints. Small welding torches provide the fine welding needed for such projects. Additionally, small welding torches also provide the user with a greater degree of maneuverability. Ideally, power cables for small welding torches should also be smaller and more maneuverable as well, as having a bulky power cable attached to a small welding torch may minimize the advantages of using a small welding torch. However, a smaller power cable generally includes a smaller conductor wire as well. As the diameter of a wire decreases, its resistance increases, causing the temperature of the wire to increase as well. Additionally, the decreased cable size may restrict the flow of gas, water, or coolant through the cable. As such, the cable is cooled less effectively.

BRIEF DESCRIPTION

In certain embodiments, a welding cable system includes a conduit for cooling fluid and electrical power. The conduit includes a first segment, a second segment, which is smaller in diameter than the first segment, and a coupler which connects the first segment and the second segment.

In accordance with another embodiment of the present disclosure, a welding torch is coupled to a welding cable system that includes a conduit for cooling fluid and electrical power. The conduit includes a first segment, a second segment which is smaller in diameter than the first segment, and a coupler which connects the first segment and the second segment.

Another embodiment includes a welding cable cooling method. The welding cable cooling method includes conducting cooling fluid through a first segment of a welding cable, conducting cooling fluid through a coupler; and conducting cooling fluid through a second segment of the welding cable. The coupler is coupled to the first segment and the second segment, and the second segment of the welding cable is configured to be smaller in diameter than the first segment of the welding cable. The method also includes conducting electrical power through a segment of welding cable having a large conductive wire, and conducting the same electrical power through a segment of welding cable having a small conductive wire, such that the large conductive wire and the small conductive wire are coupled together.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

The following discloses a novel high flow power cable for a welding system. The high flow power cable provides the benefits of a maneuverable power cable while having a means for effective cooling. Embodiments of the high flow power cable may be used in a Tungsten Inert Gas (TIG) welding system, the details of which are described below.

Figure 1:
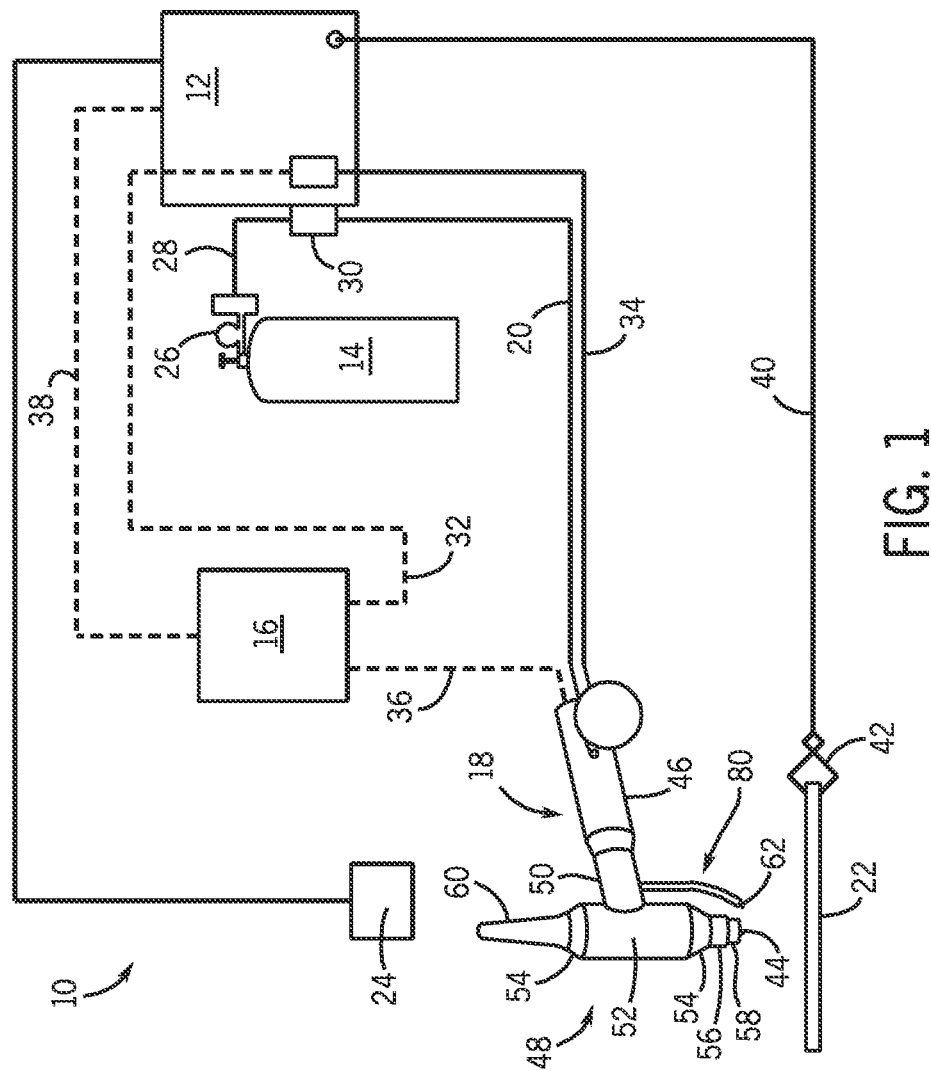
FIG. 1 is a diagrammatical view of an exemplary welding system to be used with a high flow power cable, in accordance with embodiments of the present disclosure.

Referring now to FIG. 1, a welding system 10 in accordance with one embodiment of the present technique is illustrated with both an electrode 44 and a filler material 62 in an independent arrangement. For example, as discussed in detail below, the filler material 62 may be thermally shielded and/or disposed away from the electrode 44, which generates a significant amount of heat during a welding process. In other words, the electrode 44 and the filler material 62 may be kept apart from one another to reduce the possibility of the filler material 62 corrupting the electrode 44, or the electrode 44 prematurely melting the filler material 62, or both. In the illustrated embodiment, the welding system 10 includes a tungsten inert gas (TIG) welding system, and thus the electrode 44 is a non-consumable tungsten electrode. However, other embodiments may include other types of consumable or non-consumable electrodes.

As depicted, the TIG welding system 10 includes a power source 12, a shielding gas source 14, a cooling system 16, and a torch 18. In the illustrated embodiment, the power source 12 provides power to the welding torch 18 via a conduit cable 34. The power source 12 may supply a DC current or AC current to the torch 18 depending on the desired application. For example, an AC current may be suited for welding aluminum or magnesium, and a DC current may be suited for welding stainless steels, nickel or titanium. In addition to matching the current to the material selection, the output of the power source 12 may be varied to obtain desired weld characteristics. For example, a low AC frequency (e.g., 60 Hz) current may generate a wide arc with shallow penetration of a work piece 22, while a high AC frequency (e.g., 200 Hz) current may generate a focused arc with deeper penetration into the work piece 22.

In addition to the frequency of the current, the power source 12 may vary the amperage of the current output to the torch 18. The setting for the amperage output by the power source 12 may be adjusted by setting a knob or button or other input or interface device on the power source 12, or may be set by a remote control 24. For example, a welding system 10 may include a foot pedal remote control 24 that allows the operator to make current adjustments during welding by either holding down the foot pedal or feathering the foot pedal remote control 24 to vary the amperage. The remote control 24 may also include a finger tip control, audible command, or other form of input to signal the power source 12 to output a corresponding current.

In addition, the torch 18 may be supplied with a shielding gas from a supply 14. In general, the shielding gas may be supplied to the torch 18 and expelled from the torch at the location of the weld. The shielding gas may be expelled immediately prior to striking the welding arc and throughout welding until shortly after the welding arc is extinguished. The shielding gas protects the welding area from atmospheric gases such as nitrogen and oxygen, which can cause fusion defects, porosity, and weld metal embrittlement. The shielding gas may also transfer heat from the welding electrode to the metal and helps to start and maintain a stable arc.

As depicted in FIG. 1, the shielding gas may be provided in a container and delivered to the torch 18 via a regulator 26, a conduit 28, a gas valve 30, and the supply conduit 20. The regulator 26 may allow an operator to limit the pressure of the gas delivered to the gas valve 30 to obtain a desired flow rate. Further, the gas valve 30 may provide for stopping and starting the flow of the shielding gas to the torch 18 in coordination with other welding operations. In certain embodiments, the gas valve 30 may not be present on the power supply. Rather, the gas valve 30 may be a part of the torch 18.

The TIG welding system 10 may be provided with a cooling system 16 to reduce heat build-up. The cooling system may take various forms including gas cooled and liquid cooled systems. The cooling system 16 may provide for circulation of the coolant via a coolant supply conduit 36 and conduit cables 32 and 34, wherein supply conduit 36 provides coolant to the torch 18, and conduit cables 32 and 34 return the coolant from the torch 18 to the cooling system 16. The cooling system may be powered from the power supply 12 via a coolant system power cord 38.

In general, the welding system 10 may provide for current flow via a work piece 22 to the power source 12. For example, as depicted in FIG. 1, the welding system 10 may include a cable 40 that is secured to the work piece 22 via a work clamp 42. In this configuration, the current provided by the power source 12 flows through the supply conduit to the torch 18, flows across an arc from an electrode 44 to the work piece 22, and returns to the power source 12 via the work clamp 42 and the cable 40.

As illustrated in FIG. 1, one embodiment of the TIG welding torch 18 includes a handle 46 that is attached to a torch body 48. The handle 46 has a hollow interior to allow for routing power, shielding gas, and coolant to the welding torch 18. The torch body 48 may include a torch neck 50 and a torch head 52. The torch body 48 may provide a central-rigid support to mount all of the desired hardware of the TIG welding torch 18. For example, the torch neck 50 provides for securing the handle 46 to other components, and enables an operator to hold and manipulate the welding torch 18 and its components via the handle 46.

Other components of the welding torch 18 coupled to the torch body 48 may include an insulator 54, a nozzle 56, a collet 58, the electrode 44, and a back cap 60. The insulator 54 may be positioned on the interior of the torch body 48 to block heat produced by the welding current from passing into the torch body 48 and/or the handle 46. The nozzle 56 may be attached to the insulator 54 or the torch head 52 of the torch body 48. The nozzle 56 may include a hollow tubular shaped piece that encloses the collet 58 and the electrode 44, and provides a path for the shielding gas to pass between an interior surface of the nozzle 56 and the collet 58.

Generally, a cable may be used to contain the conduits, such that the cable carries cooling fluid and electrical power from the cooling system 16 and welder power supply 12, respectively, to the welding torch. In some embodiments of the welding system 10, a small torch may be used. Using a small torch may be advantageous for some welding applications as a small torch may provide finer weld lines and increased maneuverability. Such an embodiment is illustrated in FIG. 2.

Figure 2:
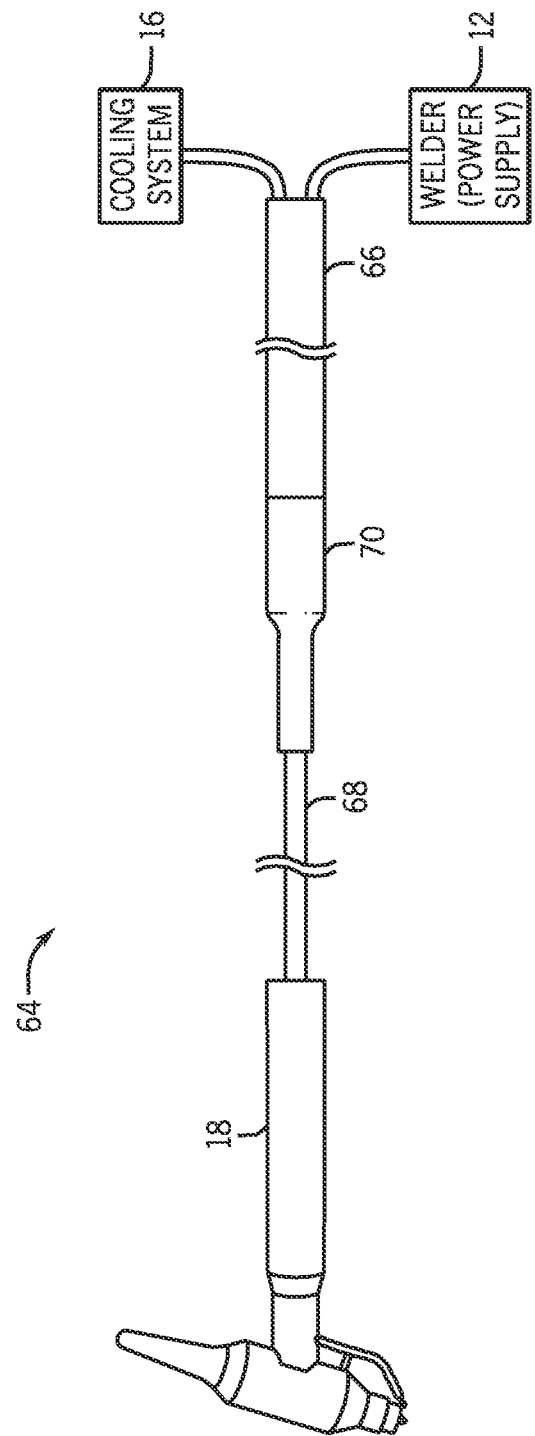
FIG. 2 is an illustration of a high flow power cable as used in an exemplary welding system, in accordance with embodiments of the present disclosure.

FIG. 2 further illustrates a novel high flow power cable 64. The high flow power cable 64 connects the welding torch 18 (generally a small welding torch) to a welder power source 12 and a cooling system 16, wherein the welder power source 12 provides welding power to the torch 18 and the cooling system 16 provides cooling fluid for the cable 64. The high flow power cable 64 includes a first segment 66, which is connected to the cooling system 16 and the welder power supply 12, a second segment 68, which is connected to the welding torch 18, and a coupler segment 70, which couples the first segment 66 to the second segment 68 as shown in FIG. 2. In one or more embodiments, welding power and cooling fluid may be provided by the same system, and the first segment 66 of the high flow power cable 64 may be connected to such a system.

Figure 3:
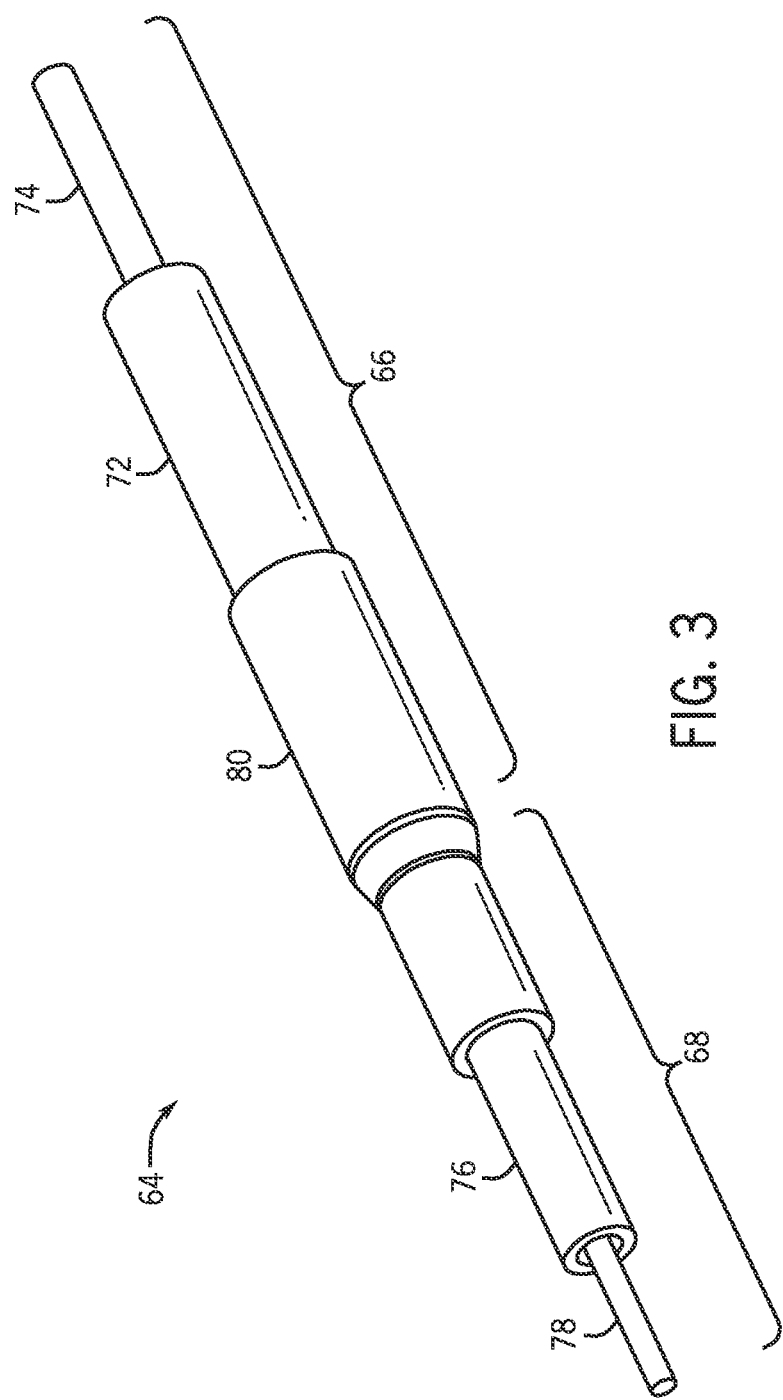
FIG. 3 is sectional view of a high flow power cable, in accordance with embodiments of the present disclosure.

A portion of the high flow power cable 64 is shown in detail in FIG. 3. The first segment 66 of the high flow power cable 64 includes a first hose 72 and a first conductive core 74. In the present embodiment, the first conductive core 74 is a round wire or conductor disposed inside the first hose 72, generally sharing the same center line. Likewise, the second segment 68 includes a second hose 76 and a second conductive core 78, in which the second conductive core 78 may be a wire or conductor disposed inside the second hose 76, generally sharing the same center line. The first hose 72 and the second hose 76 may be made of rubber, vinyl, or another suitable insulating material. The conductive cores 74, 78 may be a single wire, multiple wires twisted together, or another configuration of conductive material. The conductive cores 74, 78 may be made of copper or another conductive material. In the present embodiment, the first hose 72 may be a larger in diameter than the second hose 76, and the first conductive core 74 may be larger in diameter than the second conductive core 78. The electrical power enters the cable 64 through the first conductive core 74, and flows to the second conductive core 78, where it is delivered to the welding torch 18. The cooling fluid generally enters the cable 64 through the second hose 76, wherein the cooling fluid fills up the second hose 76, surrounding the second conductive core 78. As the cooling fluid flows to the first hose 72, the cooling fluid fills up the second hose 72, surrounding the second conductive core 74. The cooling fluid may be coolant, water, or another suitable cooling fluid.

The first segment 66 of the high flow power cable 64 may be relatively cooler in temperature due to the larger diameter of the first conductive core 74. The larger diameter of the first conductive core 74 generally gives the first conductive core 74 a lower resistance value, which following the equation: Power Dissipation=$I^2R$, (where I is the current through the cores, and R is their respective resistance values) results in less power dissipation. Thus, less heat is produced by the first conductive core 74 due to its lower resistance. Additionally, not only is the first segment 66 consequently lower in temperature, but the cooling fluid may also absorb less heat as it travels through the first segment 66 owing to the flow rate and consequent residence time. As such, the cooling fluid enters the cooling system 18 at a lower temperature, further cooling the cooling system and thus the overall welding system 10. This allows the cooling fluid to absorb more heat from the second conductive core 78 as it flows through the second segment 68, lowering the temperature of the second segment 68 as well. Additionally, the temperature of the torch 18 is lowered, providing increased torch performance.

Referring again to FIG. 2, the first segment 66 of the high flow power cable 64 is coupled to the welder power supply 12 and the cooling system 15. The second segment 68 is coupled to the first segment 66 via the coupler segment 70 on one end, and coupled to the welding torch on the opposing end, as illustrated. The welding torch 18 being connected to the second segment 68, which has a relatively smaller diameter, provides the user with better control of the welding torch 18 as there is less weight/resistance caused by the power cable 64. This novel configuration allows for more effective cooling of the power cable 64, while improving maneuverability of the power cable 64, both of which are important factors in welding practice.

Figure 4:
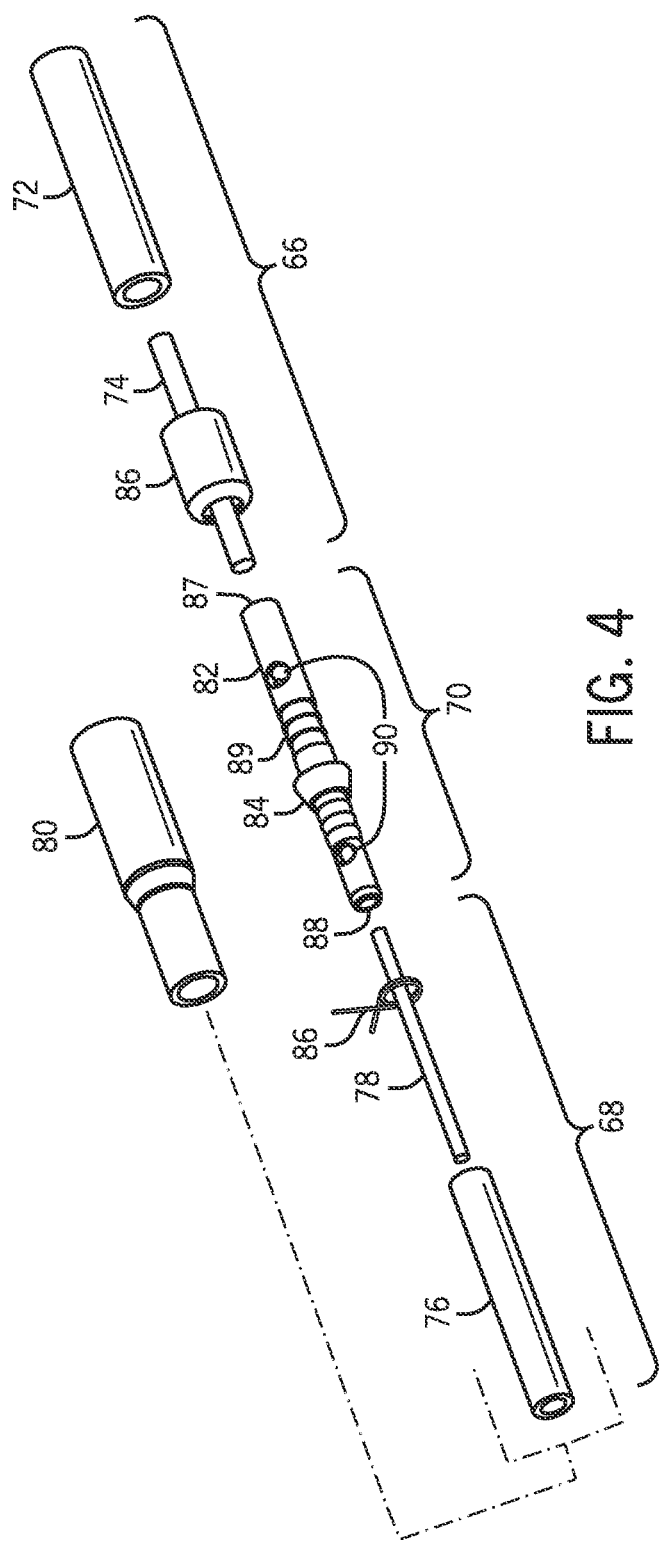
FIG. 4 is an exploded view of a high flow power cable, in accordance with embodiments of the present disclosure.

An exploded view of the high flow power cable 64 is provided in FIG. 4. In addition to elements seen in FIG. 3, such as the first hose 72, first conductive core 74, second hose 76, second conductive core 78, and coupler hose 80, the presently embodied high flow power cable 64 also includes a coupler 83, a spacer 84, and fasteners 86. The coupler 83 may be configured to electrically and physically couple the first conductive core 74 and the second conductive core 78 such that electrical power can flow from the first conductive core 74 to the second conductive core 78. In the present embodiment, the coupler 83 is tubular, having a first receptacle 87 and a second receptacle 88. The first receptacle 87 has an inner diameter slightly larger than the diameter of the first conductive core 74, such that the first conductive core 74 may fit inside the first receptacle 87. In one or more embodiments, the inner diameter of the first receptacle 87 may be infinitesimally larger than the diameter of the first conductive core 74 such that the first conductive core 74 fits tightly inside the first receptacle 87 and such that the inner surface of the first receptacle 87 is generally in contact with the surface of the first conductive core 74. Likewise, the second receptacle 88 of the coupler 83 has an inner diameter slightly larger than the diameter of the second conductive core 78, such that the second conductive core 78 may fit inside the second receptacle 88. In one or more embodiments, the inner diameter of the second receptacle 88 may be larger than the diameter of the second conductive core 78 such that the second conductive core 78 fits tightly inside the second receptacle 88 and such that the inner surface of the second receptacle 88 is generally in contact with the surface of the second conductive core 78.

In the high flow power cable 64, the first conductive core 74 is generally disposed in the first receptacle 87 of the coupler 83, and the second conductive core 78 is generally disposed in the second receptacle 88 of the coupler 83. Typically, the conductive cores 74, 78 extend beyond the portion of the conductive cores 74, 78 that is disposed inside the respective receptacle 87, 88.

The outer diameter of the first and second receptacles 87, 88 may generally be similar to the inner diameter of the first and second hoses 72, 76, respectively. The first receptacle 87 is disposed inside one end of the first hose 72, and the second receptacle 88 is disposed inside one end of the second hose. Generally, the receptacles 87, 88 fit tightly inside the hoses 72, 76, and may stretch the hose slightly when disposed in order to establish a tight fit. In the present embodiment, the receptacles 87, 88 may include ridges 89 on the outer surface. The ridges 89 may increase friction between the hoses 72, 76 and the receptacles 87, 88, generally preventing the hoses from slipping off the receptacles 87, 88. In the present embodiment, there may be a spacer 84 disposed on the coupler between the first receptacle 87 and the second receptacle 88. In the present embodiment, the first and second hoses 72, 76 are fully disposed when one end of the first hose 72 and one end of second hose 76 make contact with the respective side of the spacer 84. The spacer 84 prevents the first and second receptacles 87, 88 from being disposed too far into either one of the hoses. Typically, the first and second hoses 72, 76 extend beyond the portion of the first and second hoses, respectively, that hold the disposed coupler 83. In the present embodiment, the coupler may have holes 90 on the sides of the first and second receptacles 87, 88, as shown in FIG. 4. The holes 90 may facilitate the flow of cooling fluid through the high flow power cable 64.

Figure 5:
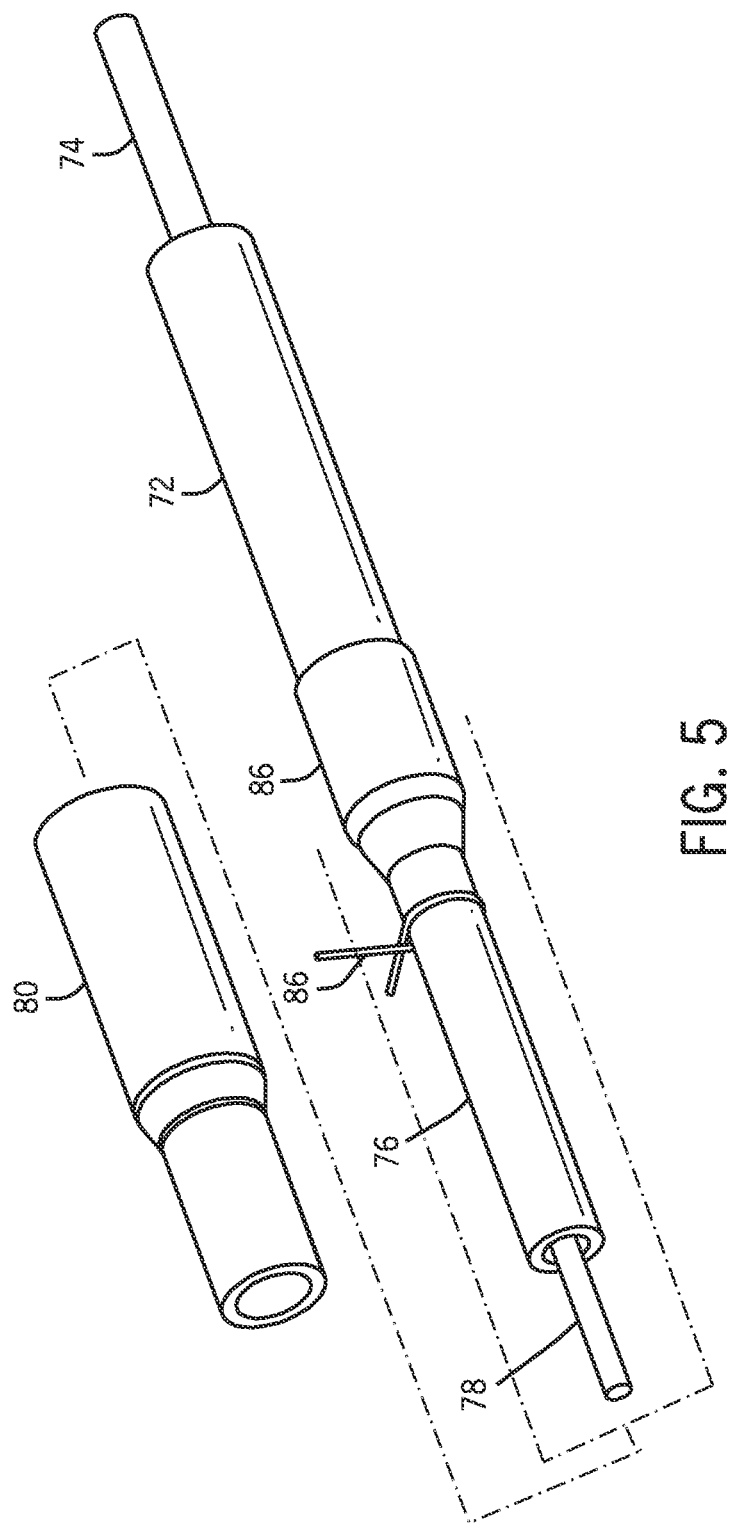
FIG. 5 is a partially exploded view of a high flow power cable, in accordance with embodiments of the present disclosure.

The exploded view of FIG. 4 exemplifies the fasteners 86 as a twist tie and a ferrule. FIG. 5 illustrates the fasteners in their assembled position as described below. The fastener 86 is generally fastened around the part of the hose that holds a disposed receptacle, such that when the fastener 86 is fully fastened, the hose is further tightly held onto the receptacle. Specifically, the fastener 86 may fasten the hose onto the ridges of the receptacle (FIG. 4). There may be a fastener 86 on each of the first and second hoses 72, 76 as shown in the present embodiment, or there may be a fastener on only one of the hoses 72, 76. The fastener 86 may a type of clamp, strap, ring, or another suitable fastening device. The fastener may be fastened by pulling, twisting, tying, pressing, clamping, and so forth.

The coupler hose 80 is configured to cover the coupler 83 as well as the ends of the first hose 72 and second hose 76 that contain the coupler 83. The coupler hose 80 includes a first end and a second end, wherein the first end covers the disposed first hose 72 and the second end covers the disposed second hose. The coupler hose 80 may be a heat shrink material such as polyolefin, which when heated, shrinks onto the ends of the first and second hoses 72, 76, the spacer 84, and any exposed part of the coupler 83. When shrunk, the coupler hose 80 may generally conform to the outer contours of the coupler 83 and the first and second hoses 72, 76, further holding these parts in place. In some embodiments, the coupler hose 80 may have a tubular shape wherein the first end and the second end have the same shape and size prior to heating, the inner diameter of the coupler hose 80 being at least as large as the outer diameter of the first hose 72. In some embodiments, the first end of the coupler hose 80 may have an inner diameter larger than the inner diameter of the second hose 76 prior to heating, wherein the inner diameter of the first end of the coupler hose 80 may be at least as large as the outer diameter of the first hose 72, and the inner diameter of the second end of the coupler hose 80 may be at least as large as the outer diameter of the second hose 74. The coupler hose 80 may cover a small section of the high flow power cable 64 as shown, or it may cover a larger portion of the high flow power cable 64, generally covering the section of the high flow power cable 64 having the coupler 83. In one or more embodiments, the coupler hose may be made of elastic material.

The length of the entire high flow power cable 64 (FIG. 2) may generally be about 12.5 feet to 25 feet, but may be longer or shorter depending on the embodiment or application. The second segment 68, which eventually couples to the welding torch 18, may generally be about 5 feet, but may also be longer or shorter depending on the embodiment or application. The first segment 66 of the high flow power cable 64 may generally be approximately 0.400" in diameter or larger, while the second segment 68 of the high flow power cable 64 may be approximately 0.400" or smaller in diameter. The dimensions disclosed above are exemplary, and certain embodiments may include a first segment 66 smaller than 0.400" in diameter and/or a second segment 68 larger than 0.400" in diameter.

Figure 6:
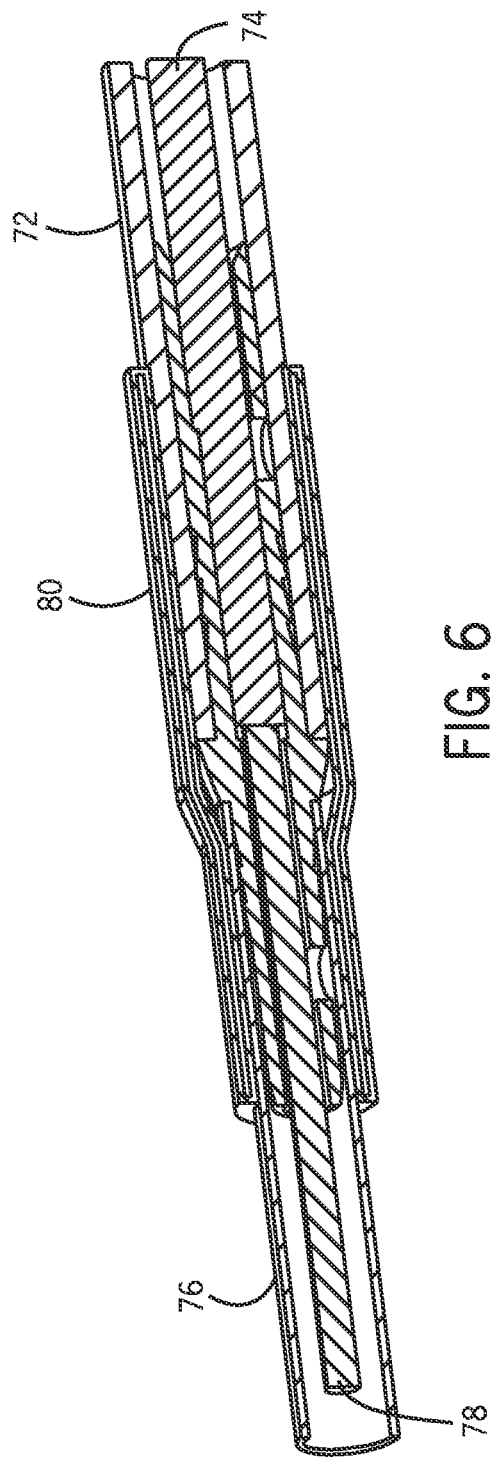
FIG. 6 is a cross-sectional view of a high flow power cable, in accordance with embodiments of the present disclosure.

A cross-sectional view of a high flow power cable 64 is provided in FIG. 6. As shown in the present embodiment, one end of the first conductive core 74 is disposed inside the first receptacle 87 of the coupler 83, and one end of the second conductive core 78 is disposed inside the second receptacle 88. The first receptacle 87 is disposed inside one end of the first hose 72 and the second receptacle 88 is disposed inside one end of the second hose 76, such that the spacer 84 is in between the first hose 72 and the second hose 76. The coupler hose 80 is disposed over and around the coupler 83 via the ends of the first hose 72 and second hose 76, as shown in FIG. 6.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A welding cable system, comprising:
 a welding power cable, comprising:
  a first segment comprising a first conduit having a first outer diameter and being disposed circumferentially around a first conductive core;
  a second segment comprising a second conduit having a smaller outer diameter than the first outer diameter of the first conduit and being disposed circumferentially around a second conductive core having a smaller diameter than the first conductive core, wherein the first and second conduits are coaxial with each other and the first and second conductive cores, electrical power flows between the first and second conductive cores, and cooling fluid flows between the first and second conduits to cool the first and second conductive cores; and
 a coupler configured to couple the first segment and the second segment, wherein the coupler comprises a first end having a first inner diameter larger than the diameter of the first conductive core and a second end having a second inner diameter smaller than the first inner diameter and larger than the diameter of the second conductive core.

2. The welding cable system of claim 1, comprising a cooling system configured to supply the cooling fluid to the first conduit at a first temperature to cool the first conductive core with the cooling fluid, and to transfer the cooling fluid at a second temperature higher than the first temperature to the second conduit to cool the second conductive core.

3. The welding cable system of claim 1, wherein the first segment is configured to be coupled to a welding power supply.

4. The welding cable(currently amended system of claim 3, wherein the welding power supply is configured to produce the electrical power and to transfer the electrical power to the first conductive core.

5. The welding cable system of claim 1, wherein the second segment is configured to be coupled to a welding torch.

6. The welding cable system of claim 1, comprising a coupler hose configured to cover the coupler and fix the relative positions of the first segment, the second segment, and the coupler with respect to one another, wherein the coupler hose comprises a first end configured to receive an end portion of the first conduit and a second end configured to receive an end portion of the second conduit, the outer diameter of the coupler hose being at least as large as the outer diameter of the first conduit.

7. The welding cable system of claim 6, wherein the coupler hose comprises a heat shrink material configured to be heated to shrink onto the end portions of the first conduit and the second conduit to secure the first segment and the second segment together.

8. A welding system, comprising:
 a welding torch; and
 a welding cable system coupled to the welding torch, the welding cable system comprising:
  a first conductive core having a first diameter;
  a second conductive core having a second diameter, the second diameter being smaller than the first diameter;
  a coupler comprising a first receptacle having a first inner diameter larger than the first diameter and a second receptacle having a second inner diameter smaller than the first inner diameter and larger than the second diameter, wherein the coupler is configured to receive the first and second conductive cores in the first and second receptacles to physically couple the first and second conductive cores about a common center line and to electrically couple the first and second conductive cores to enable electrical power to flow between the first and second conductive cores;
  a first conduit having a third outer diameter and being coaxial with and disposed about the first conductive core and configured to cool the first conductive core with cooling fluid;
  a second conduit having a fourth outer diameter smaller than the third outer diameter and being coaxial with and disposed about the second conductive core and configured to cool the second conductive core with the cooling fluid; and
  a coupler conduit configured to couple the first and second conduits about the common center line to enable the cooling fluid to flow between the first and second conduits.

9. The welding system of claim 8, wherein the coupler conduit is configured to be disposed about the coupler.

10. The welding system of claim 8, wherein the first conductive core is configured to be coupled to a power supply configured to provide the electrical power to the first conductive core.

11. The welding system of claim 8, wherein the first conduit is configured to be coupled to a cooling source configured to provide the cooling fluid to the first conduit.

12. The welding system of claim 8, wherein the welding torch comprises a tungsten inert gas (TIG) welding torch.

13. The welding system of claim 10, wherein the coupler comprises openings for facilitating flow of the cooling fluid.

14. The welding system of claim 10, wherein the coupler conduit comprises a heat shrink material configured to be heated to shrink onto ends of the first and second conduits.

15. A welding cable cooling method, comprising:
 conducting electrical power through a first conductive core having a first diameter;

conducting the electrical power through a second conductive core having a second diameter smaller than the first diameter, the first and second conductive cores being disposed about a common center line;

circulating cooling fluid through a first conduit having a third outer diameter and being disposed about the first conductive core and the common center line to cool the first conductive core; and circulating the cooling fluid through a second conduit having a fourth outer diameter smaller than the third outer diameter and being disposed about the second conductive core and the common center line to cool the second conductive core.

16. The welding cable cooling method of claim 15, comprising physically and electrically coupling the first and second conductive cores about the common center line with a coupler.

17. The welding cable cooling method of claim 15, wherein the first conductive core is configured to have lower electrical resistance than the second conductive core.

18. The welding cable cooling method of claim 15, comprising coupling the first and second conduits about the common center line with a coupler conduit.

19. The welding cable cooling method of claim 15, comprising circulating the cooling fluid from a cooling source to the first conduit.

20. The welding cable cooling method of claim 15, comprising coupling the first and second conduits with a heat shrink material configured to receive ends of the first and second conduits and to be heated to shrink to the ends of the first and second conduits.

* * * * *